United States Patent [19]

Rogler et al.

[11] Patent Number: 4,969,711

[45] Date of Patent: Nov. 13, 1990

[54] OPTICAL GLASS FIBER WITH A PRIMARY COATING OF ACRYLIC ACID ESTER GROUPS-CONTAINING ORGANO-POLYSILOXANES

[75] Inventors: Wolfgang Rogler, Erlangen; Helmut Markert, Nuremberg; Christian Weitemeyer, Essen; Dietmar Wewers, Bottrop; Goetz-Robert Koerner, Essen, all of Fed. Rep. of Germany

[73] Assignee: Siemens Aktiengesellschaft, Berlin & Munich, Fed. Rep. of Germany

[21] Appl. No.: 173,273

[22] Filed: Mar. 25, 1988

[30] Foreign Application Priority Data

Mar. 27, 1987 [DE] Fed. Rep. of Germany ....... 3710206

[51] Int. Cl.$^5$ ............................ G02B 6/00; G02B 6/02
[52] U.S. Cl. ................................ 350/96.34; 350/96.33; 428/391; 428/392; 522/99; 528/26; 528/41
[58] Field of Search ............... 428/373, 375, 391, 392; 350/96.33, 96.34; 522/99; 525/925; 528/41, 26

[56] References Cited

U.S. PATENT DOCUMENTS

| | | | |
|---|---|---|---|
| 4,270,840 | 8/1981 | Uchida et al. | 428/392 |
| 4,301,268 | 11/1981 | Kropac | 528/26 |
| 4,306,050 | 12/1981 | Koerner et al. | 528/26 |
| 4,496,210 | 1/1985 | Ansel et al. | 350/96.3 |
| 4,606,933 | 8/1986 | Griswold et al. | 427/54.1 |
| 4,678,846 | 7/1987 | Weitmeyer et al. | 525/477 |
| 4,733,924 | 3/1988 | Hida et al. | 350/96.34 |

FOREIGN PATENT DOCUMENTS

| | | |
|---|---|---|
| 0111280 | 3/1985 | European Pat. Off. . |
| 0159729 | 3/1985 | European Pat. Off. . |
| 0155051 | 6/1985 | European Pat. Off. . |
| 01699592 | 9/1985 | European Pat. Off. . |
| 343753A1 | 4/1985 | Fed. Rep. of Germany . |
| 8400424 | 2/1984 | PCT Int'l Appl. . |
| 2041389A | 2/1979 | United Kingdom . |

*Primary Examiner*—George F. Lesmes
*Assistant Examiner*—Jill M. Coray
*Attorney, Agent, or Firm*—Kenyon & Kenyon

[57] ABSTRACT

Optical glass fibers are provided with a primary coating of organo-polysiloxanes, containing acrylic acid ester groups, corresponding to the general formula:

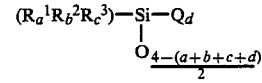

where the primary coating is free of inert components capable of migration.

4 Claims, No Drawings

OPTICAL GLASS FIBER WITH A PRIMARY COATING OF ACRYLIC ACID ESTER GROUPS-CONTAINING ORGANO-POLYSILOXANES

BACKGROUND OF THE INVENTION

The invention relates to an optical glass fiber with a primary coating, which, at least partially, consists of organo-polysiloxanes, having alkyl groups bound to silicon, and containing acrylic acid ester groups. The organo-polysiloxanes are liquid at the application temperature and are polymerizable through high-energy radiation.

Optical glass fibers are coated with synthetic materials at the time of their production. These synthetic coatings function to protect the glass fibers and to maintain their physical, in particular optical, properties against the mechanical and chemical influences of the environment. In order to meet these complex needs, the glass fibers are generally coated with two different types of coatings.

The first coating, i.e. the inner cladding layer (primary coating) in general is soft and rubbery elastic. It serves to maintain the mechanical strength inherent in the glass fibers and to protect them against microbends and attenuation. The primary coating should therefore have a glass transition temperature of less than −40° C. and its mechanical properties within the application temperature range of −40° to +80° C. should only change as little as possible, so that within these temperature limits a constant attenuation response of the coated glass fibers is ensured. The modulus of elasticity of the coating should be less than or equal to 10 N/mm². In many instances the index of refraction of the coating substance must be higher than that of the outer layer of the glass fiber. Given an index of refraction $n_D^{25}$ of quartz glass between 1.45 and 1.46, then for the inner coating substance an index of refraction of greater than 1.46 within the application temperature range is required.

The second coating, (i.e., the outer synthetic cladding) functions to protect the glass fiber covered with the first synthetic material coating against mechanical and chemical effects of the environment, in particular against the effects of moisture and against mechanical abrasion. The second coating is therefore mechanically harder than the first.

The coating substances are applied onto the glass fibers while they are being manufactured. Since the drawing process can take place at rates of greater than 5 m/s and since curable synthetic materials or synthetic preparations are used as coating substances, curing of the synthetic materials or synthetic preparations must take place in less than 1 second, and preferably in less than 0.5 seconds.

Many types of two-fold coatings are already known. These are primarily UV-curable urethane acrylates which form the primary as well as the secondary coating. Such coatings with urethane acrylates are described for example in DE-AS No. 34 37 531 and EP-OS No. 0 111 280. These materials, however, do not possess the required complex properties discussed above. Within the last few years organo-polysiloxanes modified with acrylic acid ester groups have proven useful. Given the appropriate structure, these polymers yield desirable soft-elastic coatings after curing with UV-radiation within the required time of less than 0.5 seconds.

A glass fiber with such primary cladding is described in EP- A1-0 155 051. The glass fiber is provided with a cladding having a refractive number which is higher than that of the outer layer of the glass fiber. The cladding is formed of a curable synthetic composition containing a copolymer, which has as monomeric units dimethylsiloxane and at least one siloxane from the group methylphenylsiloxane and diphenylsiloxane. The copolymer itself is a compound having the following configuration:

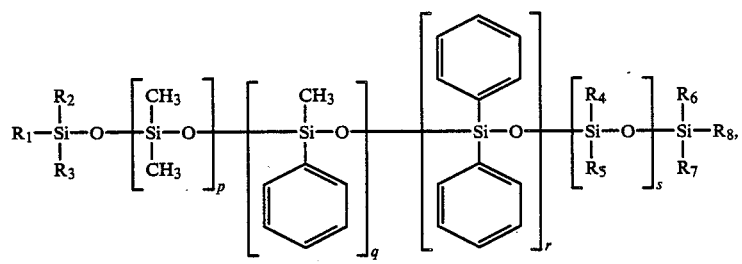

in which $R_1$ and $R_8$ are alkyl, aryl, and acrylate-containing alkyl groups, $R_2$, $R_3$, $R_4$, $R_6$, and $R_7$ are alkyl and aryl groups, and $R_5$ is an acrylate-containing organic group. The mean molecular weight of the polymer molecules lies between 1000 and 1 000 000, and the average fractions of the monomeric units per polymer molecule lie withing the following limits:

p is greater than or equal to 0.005 and is less than or equal to 0.995 q is greater than or equal to 0 and is less than or equal to 0.995 r is greater than or equal to 0 and is less than or equal to 0.49 s is greater than or equal to 0 and is less than or equal to 0.1, where (q+2r) is greater than or equal to 0.005 and is less than or equal to 0.955 and the monomeric units can be distributed in the molecule block-wise, alternating, or in any given way, and where the copolymer contains at least two acrylate groups per molecule.

The acrylate-containing alkyl group is a group of the formula —R₉OCOCH═CH₂, where R₉ is an alkylene residue, for example the group —(CH₂)ₙ—with n greater than or equal to 1. Consequently, the coating materials are made functional with monoacrylate groups, which are bound to the siloxane chain through a Si—C bond.

Published international patent application WO No. 84/00424 describes primary coating materials comprised of silicon acrylates having a molecular weight of 500 to 5000 and 2 to 6 monoacrylate groups. These monoacrylate groups are preferably bound through Si—C bonds to the siloxane chain. Silicon acrylates with a Si—O—C bond are considered to be less suitable as primary coating materials since a potential hydrolytic degradation of the coating materials, through changing mechanical properties, would lead to a change of the attenuation response and, consequently, to unsatisfactory long-term behavior of the optical fiber.

The state of the art organo-polysiloxanes modified with acrylic acid ester groups are manufactured by preparing organo-polysiloxanes having reactive groups and subsequently converting them with organic compounds which contain acrylate groups. In addition to Si bound methyl groups, the organo-polysiloxanes have a minimum quantity of phenyl groups bound to Si atoms in order to meet the required refractive number. The organo-polysiloxanes are, therefore, prepared through cohydrolysis and cocondensation of silanes carrying methyl and phenyl groups. As unavoidable by-products varying quantities of cyclic compounds form which cannot be separated by distillation. They can only be removed from the resulting organo- polysiloxanes with particular difficulty. These cyclic compounds, therefore, after conversion with the compounds containing the acrylate groups, are contained in the coating substance as an inert component. Since these compounds are not tied into the polymeric matrix in the curing process, they can, in the course of time, migrate from the coating substance. However, when this occurs the elastic properties of the cured coating substance are changed. Furthermore, improper adhesion of the second coating layer can occur, which leads to partial or complete separation of the second coating.

Another disadvantage of organo-polysiloxanes with Si-bonded phenyl substituents is that with increasing content of phenyl groups the freezing temperature of the cured coating materials is shifted toward higher temperatures (i.e., > −40° C.). Such organo-polysiloxanes are not suitable for coating optical glass fibers, since they would lead to marked changes of the elastic properties within the application temperature range of optical glass fibers.

Accordingly, it is an object of the invention to provide an optical glass fiber with a primary coating of organo- polysiloxanes which has a high refractive index and a glass transition temperature below −40° C. but which does not have the disadvantages described above and which is free of inert components capable of migration.

Another object of the invention is to provide a primary coating which has good bonding with the second coating despite the fact that the second coating is not based on organo-polysiloxanes and consists of polyurethanes.

Another object of the invention is to provide a soft-elastic primary coating which demonstrates improved compatibility with organic coating materials and which is easily applied.

SUMMARY OF THE INVENTION

The invention provides optical glass fibers with a primary coating comprised of organo-polysiloxane compounds of the general formula:

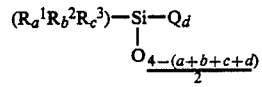

in which the following applies:

$R^1$ is methyl, $R^2$ is a linear-chain, branched or cyclic alkyl residue with 5 to 18 carbon atoms, which can possibly be substituted with a halogen, $R^3$ is an aralkyl of the following structure:

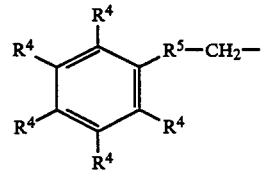

with $R^4$ is hydrogen and/or alkyl with 1 to 12 carbon atoms and/or halogen, and $R^5$ is alkylene with 1 to 8 carbon atoms (linear-chain or branched)

Q is a multiple acrylic and/or methacrylic acid ester of a polyol bound through the oxygen atom of a hydroxyl group reduced by the hydrogen atom to silicon, the polyol being from the group consisting of pentaerythritol, trimethylolethane, trimethylolpropane, and glycerin, as well as their dimers and/or oxyalkylene derivatives with 1 to 10 oxyethylene and/or oxypropylene units, where a is greater than or equal to 0.9 and b plus c is less than or equal to 0.9 b, c are 0 to 1.1, b plus c is greater than or equal to 0.1, $\Sigma a, b, c$ are 1.8 to 2.2, and d is 0.001 to 1.6, and whereby the organo-polysiloxanes contain a maximum of 4 percent by weight of fractions volatile at 130° C./30 mbar.

Preferably, the organo-polysiloxanes contain a maximum of 2 percent by weight of fractions which are volatile at 130° C./30 mbar and most preferably contain no more than 1 percent by weight of fractions which are volatile at 130° C./30 mbar.

DETAILED DESCRIPTION OF THE INVENTION

In the organo-polysiloxanes functioning as primary coatings of optical glass fibers according to the invention, particularly significant is the presence of the residues $R^2$ and $R^3$. The residue $R^2$ is an alkyl residue with 5 to 18 carbon atoms, which can be a linear chain, branched, or cyclic, with linear-chain alkyl residues being preferred. Since such alkyl residues are introduced through the addition of olefins to SiH groups of the siloxane serving as starting compound, it is also possible, that alkyl residues of different chain lengths are contained in the average polymeric molecule. The alkyl residue, further, can be substituted with halogen, with fluoro residues being preferred. Suitable residues $R^2$ include, for example, pentyl, hexyl, octyl, decyl, dodecyl, cyclopentylethyl, cyclohexylethyl, cyclohexenylethyl, norbornyl, and perfluoroalkylnorbornyl residues.

The organo-polysiloxanes according to the invention can also have residues R³. These residues R³ can be β-phenylethyl, β-phenylpropyl, β-phenylpropyl, o-methylphenylethyl, 3,5-dimethylphenylethyl, p-nonylphenylethyl, o-bromophenylethyl, 3,5-dibromophenylethyl, p-chlorophenylethyl, and 3,5-dichlorophenylethyl residues.

The (meth-)acrylic acid ester groups of the polysiloxanes are constituent of the substituent Q. This substituent is the multiple (meth-)acrylic acid ester of a polyol (polyalcohol) reduced by the hydrogen atom of a hydroxyl group, where the polyol can be pentaerythritol, trimethylolethane, trimethylolpropane, and glycerin. Of the n hydroxyl functions of these multivalent alcohols maximally n−1 hydroxyl functions are esterified with (meth-) acrylic acid. The remaining hydroxyl function serves for bonding with the organo-polysiloxane so that the residue Q forms a Si—O—C bridge with the Si atom of the polysiloxane frame.

The above mentioned partially esterified polyalcohols can also be present in the form of their dimers, which can be obtained through intermolecular condensation. Before their esterification with (meth-)acrylic acid, the polyalcohols pentaerythritol, trimethylolethane, trimethylolpropane, and glycerin can also be converted with alkylene oxides (i.e., ethylene oxide and/or propylene oxide) where 1 to 10 of such oxyethylene or oxypropylene units can be added. Consequently, the residue Q can be derived from pentaerythritol triacrylate, dipentaerythritol pentaacrylate, trimethylolethane diacrylate, ditrimethylolethane triacrylate, trimethylolpropane diacrylate, ditrimethylolpropane triacrylate, glycerin diacrylate, diglycerin triacrylate, or their oxyalkylene ethers.

The indices a, b, c, and d determine the content of silicon- bound hydrocarbon residues, the quantity of Si—O—C bound (meth-) acrylic acid ester groups, and the permissible degree of branching of the organo-polysiloxanes. The index a indicates the number of methyl residues bound to Si atoms. At least 50% of the hydrocarbon groups bound to Si atoms must be methyl residues. The indices b and c indicate the content of residues R² and R³. The higher the content of residues R² and R³, the better is the bonding of the first coating with a second siloxane-free coating. Moreover, the presence of groups R² improves the elastic-plastic properties of the first coating. The required index of refraction of the first coating substance can be influenced by the kind and the quantity of residues R³. Surprisingly, it has been shown, that setting the refractive index with the residues R² and R³ compared to corresponding dimethyl-polysiloxanes permits a lowering of the freezing temperature.

By using organo-polysiloxanes which contain a maximum of 4 percent by weight of fractions volatile at 130° C./30 mbar, it is ensured that no liquid inert cyclic siloxanes are present, which could migrate from the coating substance. In contrast to the methylphenyl-polysiloxanes starting materials used according to the state of the art, the cyclic siloxanes can be distillatively removed in a simple manner from the methylhydrogensiloxanes (the starting materials for preparing the polysiloxanes to be used according to the invention). This leads to a substantial improvement of the properties of the coating substances enveloping the glass fiber which maintain their required elastic-plastic properties even under long-term temperature stress. Moreover, no adhesion problems of any kind with the second coating occur.

The acrylic acid ester groups-containing organo-polysiloxanes can be prepared in such a manner that to a halogen or alkoxyhydrogen-polysiloxane of the general formula

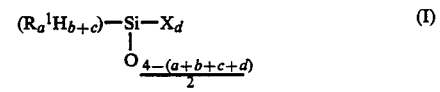

where R¹, a, b, c, and d are defined as previously stated, and X signifies halogen or alkoxy with 2 to 4 carbon atoms, b mol of a linear-chain, branched, or cyclic olefin with 5 to 18 carbon atoms, and/or c mol of an aralkylene compound of the general formula

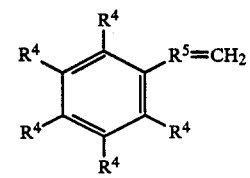

are added in a manner known per se for the addition of olefinic groups to SiH groups, and the thus obtained product of the general formula

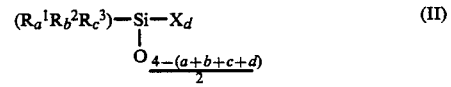

subsequently is converted with at least d mol of a (meth-)acrylic acid ester of the formula Q—H, where Q is defined as previously stated, in a manner known per se.

The method of manufacture, hence, has three stages. In the first stage the siloxane is freed of volatile components. In the second stage, olefins with 5 to 18 carbon atoms and/or aromatic hydrocarbons with an alkenyl group are added initially to halogen or alkoxyhydrogen-polysiloxanes of the general formula I. The addition takes place in a manner known for the addition of compounds with olefinic groups to SiH groups. Such additions are, in general, carried out in the presence of platinum catalysts, for example H₂PtCl₆, and possibly at elevated temperatures up to approximately 150° C.

As olefins α-olefins are preferred, and olefin mixtures which have the required carbon number, can also be used. Suitable aromatic hydrocarbons with an alkylene group include sytrene, α-methyl styrene, p-bromo styrene, and allyl benzene.

In the third stage of the method the intermediate products obtained (formula II) are converted in a known manner with at least d mol (meth-)acrylic acid ester Q-H. This conversion can take place in accordance with the method described in German patent No. 27 47 233, wherein catalysts like titanic acid esters and isopropyltitanate or isobutyltitanate are effectively employed. Increased temperatures, particularly temperatures of 120° to 150° C. are maintained for the conversion. Polymerization inhibitors, like p-dihydroxybenzene, are advantageously admixed. If the residue X is a halogen residue, the corresponding hydrogen halide is advantageously neutralized by the introduction of ammonia or the admixture of an alkaline, like sodium carbonate. If X is an alkoxy residue with 2 to 4 carbon atoms, the released low alcohol escapes while the reaction temperatures are maintained from the reaction mixture.

The organo-polysiloxanes can be used on their own or they can be mixed with other unsaturated compounds capable for copolymerization. Examples of such compounds are mono-, oligo- or polymeric epoxy-, ether-, ester- and urethane acrylates or methacrylates, as well as esters of unsaturated dicarboxylic acids, allyl esters and other vinylic compounds like vinyl aromates or vinyl lactames.

Hardening of the organo-polysiloxanes takes place by energetic radiation. When hardening with ultraviolet rays it is necessary to add a radical starter, preferably in amounts of 2 to 10% by weight with respect to modified siloxane. Selection of the radical starter can take place according to the wavelength spectrum of the UV-radiation source used for the hardening. Such radical starters are known, for example, benzophenone, its oximes or benzoin ethers or other compounds can be used. The inventive organo-polysiloxanes may also be hardened by laser light, electron radiation and γ-beams without the addition of initiators.

The coating substances, which surprisingly fulfill all the requirements of primary coatings for optical glass fibers, can be compounded, processed and cured in a manner known per se. Modification means can also be included such as are known, for example, from DE-AS No. 26 02 809 and DE-OS No. 32 18 675.

The invention will be explained in greater detail with reference to embodiments.

EXAMPLE 1

Manufacture of α,ω-di(pentaerythritoltriacrylate)-polydimethyl-(hexylmethyl)-(2-phenylpropyl-methyl)siloxane of the average formula

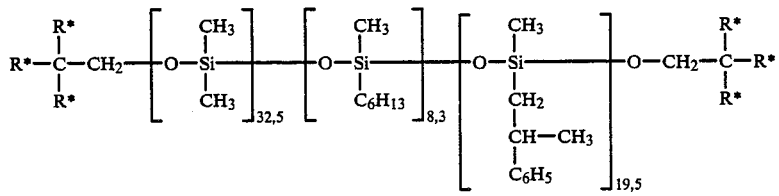

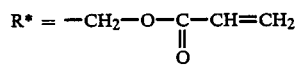

1st Step

The volatile components of the used α,ω-dichloropolymethylhydrogensiloxane (for closer characterization see the 2nd step) are drawn off at the rotary evaporator at 130° C. and 30 mbar.

2nd Step 150 g of an α,ω-dichloropolymethylhydrogensiloxane pretreated according to the first step having the average formula $Cl(SiMe_2O)_{31,5}$-$(SiHMeO)_{27,8}$-$SiMe_2Cl$ (Me=CH$_3$) and 5 ml of a solution of 4 mg $H_2PtCl_6.H_2O$ in 3 ml glycoldimethylether are placed into a 500 ml 4-necked flask, equipped with reflux cooler (with CaCO$_3$ dry pipe), thermometer, drop funnel, magnetic stirrer and heating bath, and heated to 100° C. While stirring 83.6 g α-methyl styrene (708 mmol) and 25.5 g 1-hexene (303 mmol) are successively added dropwise over 6 hours so that the temperature does not exceed 110° C. Stirring is continued for 6 hours at 110° C. Subsequently, at 5 mbar and a temperature of 80° C. of the flask the volatile components are removed. Yield: 246 g (95% of the theoretical yield).

3rd Step 16.5 g diisopropylamine (163 mmol) are added to 150 g toluene. Subsequently 150 g of the chlorosiloxane prepared according to the 2nd step are added dropwise at 70° C., and stirred for 1 hour at 70° C. Next copper powder (0.2 g) is added as inhibitor. 24.3 g (82 mmol) pentaerythritol triacrylate is added dropwise and the solution is stirred for 40 minutes. The resulting precipitate is filtered and the filtrate is again mixed with 0.2 g copper powder. The solvent is distilled off in a water jet vacuum up to a maximum heat sink temperature of 80° C. Lastly, a pressure filtration takes place through a press. Yield: 154.2 g; $n_D^{25}$ is 1.4820.

EXAMPLE 2

Manufacture of α,ω-di(pentaerythritoltriacrylate)-polydimethyl(2-phenylpropyl-methyl)siloxane of the average formula

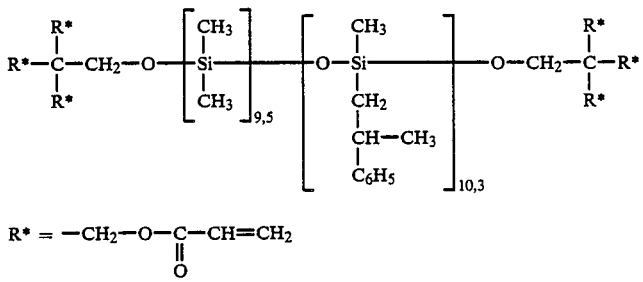

1st Step

The volatile components of the used α,ω-dichloropolymethylhydrogensiloxane (for closer characterization see the 2nd step) are drawn off at 130° C. and 30 mbar at the rotary evaporator.

2nd Step

In an apparatus corresponding to example 1, 100 g of a dichloro- polymethylhydrogensiloxane of the average formula. $Cl(SiMe_2O)_{8,5}\text{-}(SiHMeO)_{10,3}\text{-}SiMe_2Cl$ ($Me=CH_3$) is converted with 84.6 g α-methyl styrene (716 mmol) and processed; yield: 176.8 g (95.8% of the theoretical yield).

3rd Step

In a manner corresponding to the 3rd step of example 1, 150 g chlorosiloxane is allowed to react in 100 g toluene using 50 g diisopropylamine and 0.3 g copper powder with 73.1 g pentaerythritoltriacrylate. After processing analogous to example 1, 144.4 g of a product with $n_D^{20}=1.4908$ is obtained.

EXAMPLE 3

Preparation of α,ω-di(trimethylolpropane diacrylate)polydimethyl-(dodecyl-methyl)siloxane of the average formula

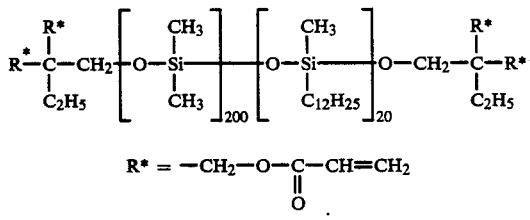

$$R^* = -CH_2-O-\underset{\underset{O}{\|}}{C}-CH=CH_2$$

1st Step

The volatile components of the utilized α,ωdichloropolymethylhydrogensiloxane (for closer characterization see the 2nd step) are drawn off at 130° C. and 30 mbar at the rotary evaporator.

2nd Step

In an apparatus corresponding to example 1, 150 g of an α,ωdichloropolymethylhydrogensiloxane of the average formula $Cl(SiMe_2O)_{199}\text{-}(SiHMeO)_{20}\text{-}SiMe_2Cl$ ($Me=CH_3$) are converted with 31.6 g dodecene-1 (187 mmol) and processed; yield: 176.1 g (97.0% of the theoretical yield).

3rd Step

In a manner corresponding to example 1, 150 g chlorosiloxane are allowed to react in 100 g toluene using 3.1 g diisopropylamine and 0.3 g copper powder with 3.8 g trimethylolpropane diacarylate. After processing analogous to example 1, 130.2 g of the final product are obtained.

EXAMPLE 4

Testing the hydrolysis stability

To a mixture of silicon acrylates consisting of 70% of the silicon acrylate prepared according to example 1 having an average chain length of n equal to 60 and 30% of a product prepared analogously of n=100 (n is the average number of the siloxane units), with an acrylate content of 0.06 mol/100 g and a refractive index of $n_D^{25}$ is 1.483, 4% of a commercially available photoinitiator mixture (Tego Photoinitiator A4 by Th. Goldschmidt AG) was added. The mixture was homogenized at room temperature in vacuo and subsequently the coating material was projected at a coating thickness of 200±5 μm onto silicon wafers (diameter: 10 cm). UV-curing takes place with a fusion irradiation installation with Hg bulbs and elliptic reflector in a nitrogen atmosphere. The films pulled off the silicon carriers are stored horizontally on teflon carriers in a climate cabinet (40° C., 92% relative ambient humidity). After three weeks samples are taken and kept for 24 hours at room temperature, and subsequently through tensile elongation measurements with an Instron apparatus (sample geometry: 50×5 mm) the modulus of elasticity is determined at 2% elongation. A decrease of the starting modulus of elasticity of 0.73 N/mm² by 5% is noted.

EXAMPLE 5

Testing the curing rate

The polyorgano-siloxane corresponding to example 1 (60 siloxane units) having a viscosity of 4400 mPa.s at 25° C., a refractive index of $n_D^{25}$ is 1.482 and an acrylate content of 0.07 mol/100 g is mixed with 4% of a commercially available photoinitiator mixture, homogenized in vacuo, and projected in a layer thickness of 100±3 μm onto silicon wafers. The coated wafers are guided below a fusion irradiation installation with Hg bulbs and elliptical reflectors in a protective gas on a belt. Each pass corresponds to an irradiation time of 0.1 s. After storing the irradiated samples for 24 hours at room temperature, these are stripped off the silicon carriers and cut into strips having the dimension 50×5×0.1 mm. Subsequently, the modulus of elasticity is determined at an elongation of 2% using an Instron tension testing machine. As can be seen from the following table, after an irradiation time of 0.4 seconds, 94% of the maximum modulus of elasticity of 1.41 N/mm² is reached.

| Irradiation time [seconds] | Silicon acrylate modulus of elasticity [N/mm²] |
| --- | --- |
| 0.1 | 0.82 |
| 0.2 | 0.92 |
| 0.4 | 1.32 |
| 3.2 | 1.41 |

EXAMPLE 6

Testing the thermal-mechanical properties

400 μm thick UV-cured films prepared from the silicon acrylates described in example 1 and example 4, are measured in the dynamic-mechanical spectrometer Polymer DMTA. The samples are stressed on 3-point holding arrangement with a frequency of 1 Hz at a heating rate of 5 K/min. A glass transition temperature of −60° C. for the siliconacrylate cured according to example 4 is obtained. A comparison of the dynamic-mechanical response of the silicon-acrylate corresponding to example 1 with that of a commercially available urethane acrylate used as primary coating (De Soto Product 950×65) shows that the siliconacrylate according to the invention has a glass transition temperature of −55° C. and a constant modulus of storage E′ in the temperature range from −40° C. to +100° C., while the commercially available urethane acrylate has a glass transition temperature of 0° C. and a constant modulus of storage above +30° C.

EXAMPLE 7

Coating a glass fiber and testing the coated fiber

On a fiber drawing tower from a preform a monomode fiber having an outer diameter of 125 μm was drawn and provided by means of a cell with the UV-curable siliconacrylate according to the invention corresponding to example 1. The siliconacrylate could be applied without dripping in a coating thickness of approximately 37 μm, corresponding to an outer diameter of the primary coated fiber of 200 μm. For the mechanical protection of the fiber, a commercially available UV-curable urethane acrylate was applied by means of a second cell in a layer thickness of 25 μm as secondary coating. The doubly coated fiber had an outer diameter of 250 μm. Between the coating cells as well as after the second coating cell, the fiber passed through a UV path totalling 75 cm with spheroidal reflectors and a lamp output of 120 Watt/cm. During curing, flushing with nitrogen was carried out. The drawing rate was 2 m/s. Attenuation measurements yielded attenuation values customary for monomode fibers of less than 0.5 dB/km.

Samples of the coated fiber were stored at a climate of 40° C. and 92% relative ambient humidity as well as at a temperature of 100° C. Evaluation criterion for the response of the coating during stress was the shrinkage determined from the change of the total fiber diameter. After eight weeks following climate storage, shrinkage of only 2% was noted, following temperature storage no change could be observed.

What is claimed is:

1. An optical glass fiber having a primary coating, comprising organo-polysiloxanes having alkyl groups bound to silicon and containing acrylic acid ester groups, where the organo-polysiloxanes are liquid at the application temperature and are polymerizable by high-energy radiation, wherein the organo-polysiloxanes are compounds having the general formula

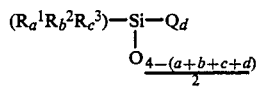

where the following applies:
$R^1$ is methyl,
$R^2$ is a linear-chain, branched, or cyclic alkyl residue with 5 to 18 carbon atoms, which can optionally be substituted with halogen,
$R^3$ is an aralkyl of the following structure:

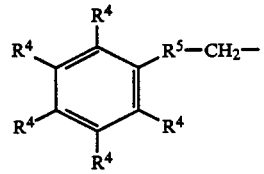

where any
$R^4$ is any substituent selected from the group consisting of hydrogen, alkyl with 1 to 12 carbon atoms and halogen, and
$R^5$ is alkylene with 1 to 8 carbon atoms (linear-chain or branched),
any Q is any member selected from the group consisting of: multiple acrylic and methacrylic acid esters of a polyol bound through the oxygen atom of a hydroxyl group minus the hydrogen atom to silicon, the polyol selected from the group consisting of pentaerythritol, trimethylolethane, trimethylolpropane, and glycerin; dimers of said esters; and oxyalkylene derivatives of said esters where the polyol has been converted so as to have 1 to 10 units of at least one of oxyethylene and oxypropylene,
a is greater than or equal to 0.9 and b plus c is less than or equal to 0.9,
b, c are 0 to 1.1,
b plus c is greater than or equal to 0.1,
$\Sigma a,b,c$ is 1.8 to 2.2, and
d is 0.001 to 1.6,
and wherein the organo-polysiloxanes contain a maximum of 4 percent by weight of fractions volatile at 130° C./30 mbar.

2. An optical glass fiber according to claim 1, wherein the residue Q of the organo-polysiloxanes is the residue minus the hydrogen atom of a hydroxyl group of a compound selected from the group consisting of pentaerythritoltriacrylate, dipentaerythritolpentaacrylate, trimethylolethanediacrylate, ditrimethylolethane triacrylate, trimethylolpropane diacrylate, ditrimethylolpropane triacrylate, glycerin diacrylate, diglycerin triacrylate or of their oxyalkylene derivatives with 1 to 10 oxyethylene or oxypropylene units.

3. An optical glass fiber according to claim 1, characterized in that the residue $R^3$ of the organo-polysiloxanes is a phenylethyl or phenylpropyl residue.

4. An optical glass fiber according to claim 2 characterized in that the residue $R^3$ of the organo-polysiloxanes is a phenylethyl or phenylpropyl residue.

* * * * *